March 31, 1964   J. L. BROWN   3,126,814
ROTISSERIE
Filed Oct. 3, 1962
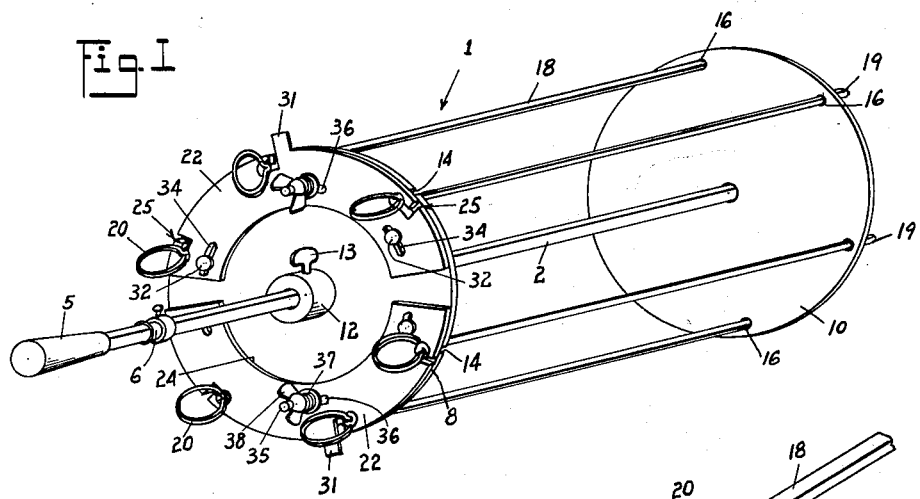
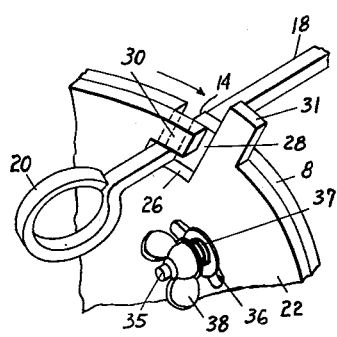
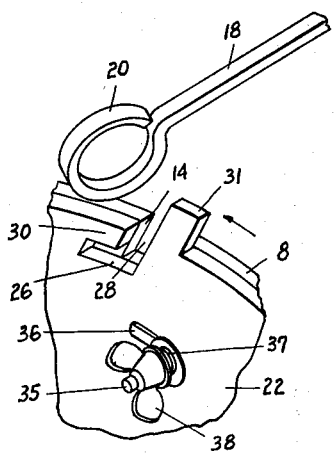
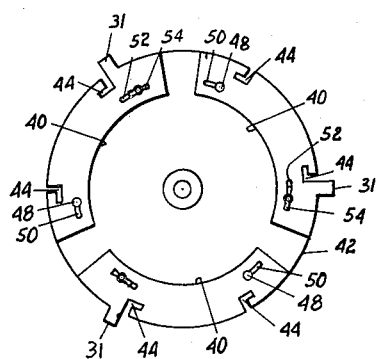
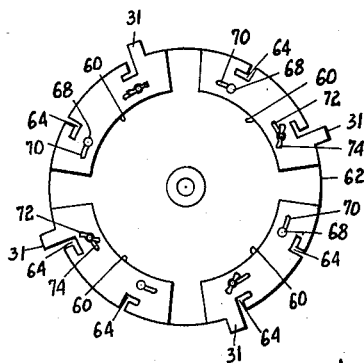
INVENTOR.
JUSTIN L. BROWN
BY
Teare, Fetzer & Teare
ATTORNEYS

United States Patent Office 3,126,814
Patented Mar. 31, 1964

3,126,814
ROTISSERIE
Justin L. Brown, 1487 Lakeland Ave., Lakewood, Ohio
Filed Oct. 3, 1962, Ser. No. 228,179
1 Claim. (Cl. 99—421)

This invention relates to a new and useful rotisserie arrangement, and more particularly to novel arrangement whereby a plurality of skewers are detachably mounted on rotating disks for supporting food items thereon during cooking.

Heretofore, various types of barbecue equipment have been utilized, but there has always been a problem of providing a device which can be easily inserted into a domestic or commercial oven for indoor cooking and which at the same time is easily convertible to use with conventional barbecue grills and the like for outdoor cooking. Heretofore, such barbecue equipment took the form of rotisserie arrangements comprising a plurality of spits or skewers adapted for rotating various food items in contact with a heating media. Such rotisserie arrangements have heretofore been exceedingly complicated from a mechanical standpoint and have been undependable in operation due to the tendency for the skewers or spits to become detached, causing the food items to be non-uniformly cooked or entirely wasted, as a result of falling into the heating media. In addition to being mechanically undependable, prior arrangements have been impractical and time consuming as requiring each skewer to be individually locked and unlocked from the assembly during normal usage. In many instances, the means for locking the skewers, in the assembled position, required the use of many small component parts which were not only easily susceptible of becoming lost because of their small construction, but which also became clogged with drippings from the food items being cooked, rendering cleaning thereof difficult and resulting in an unsanitary condition.

Accordingly, it is an object of the present invention to provide a novel rotisserie arrangement of a convertible construction which may be selectively adapted for use with domestic and/or commercial ovens for indoor usage or which may be easily adapted for use with conventional barbecue equipment for outdoor usage.

Another object of this invention resides in the particular construction of novel means for removably mounting a plurality of skewers on rotating disks, so arranged that the skewers may be selectively and conveniently locked thereon and removed therefrom during normal use.

A further object of the present invention resides in the particular construction of a novel retaining means whereby two or more skewers for supporting a plurality of food items thereon may be selectively and simultaneously mounted between a pair of spaced disks and selectively and simultaneously moved therefrom during normal use.

Another object of the present invention is to provide a rotisserie arrangement including a novel supporting means whereby many varieties and sizes of food items may be efficiently and expeditiously cooked and which is constructed to facilitate cleaning thereof.

A still further object of the present invention is to provide a novel rotisserie arrangement which is compact and attractive in appearance and which is susceptible to construction in various sizes and which is correspondingly inexpensive to construct and operate.

With these and other objects in view, which will become apparent as the description proceeds, this invention resides in the construction, combination and arrangement of parts, hereinafter more fully described and claim, and illustrated in the accompanying drawings, in which like references characters indicate like parts throughout several figures, of which:

FIG. 1 is a perspective view, on a reduced scale, showing one form of the rotisserie embodying the present invention with the skewers retained thereon in a locked position;

FIG. 2 is an enlarged fragmentary perspective view of one of the supporting disks embodying the present invention, showing one of the arcuate slide plates rotated in a clockwise direction for interlockingly retaining one of the skewers thereon;

FIG. 3 is a fragmentary perspective view of the supporting disk of FIG. 2, showing the arcuate slide plate rotated in a counterclockwise direction to selectively release one of the skewers therefrom;

FIG. 4 is a front elevational view, on a reduced scale, showing a modification of the novel retaining arrangement embodying the present invention;

FIG. 5 is a front elevational view, on a reduced scale, showing another modification of the novel retaining arrangement of the present invention.

In brief, to accomplish the objects of the present invention, there is provided an elongated shaft or spit adapted for rotation about its longitudinal axes, a pair of spaced disks removably mounted on the shaft and adapted for lengthwise adjustment thereon, one of said disks having spaced apertures extending therethrough adjacent the periphery thereof and the other of said disks having radially extending slots opening onto the periphery thereof and aligned for registration with the spaced apertures of the aforementioned disk. The latter of said disks is provided with a plurality of arcuate slide plates movably mounted on one face thereof and each having spaced retaining slots opening onto the periphery thereof for registration with the radially extending slots in the disk. A plurality of skewers for continuously transporting food items impaled thereon in a circular path are removably supported at one end thereof within the apertures in said first mentioned disk and at the other end within the radially extending slots in the other disk and within the registering retaining slots of the arcuate slide plates. The arcuate slide plates are resiliently mounted on their associated disk and have means thereon for moving them relative to the disk for selectively and simultaneously interlocking two or more skewers thereon, and for selectively and simultaneously releasing two or more skewers therefrom during the cooking process.

Referring now more particularly to the drawings, one form of the rotisserie is broadly designated by the reference character 1, which includes a spit of conventional construction having a generally rectangular shaft 2 pointed at one end for impaling food items thereon and provided with a suitable handle 5 at the opposite end thereof. The spit may be provided adjacent its handled end with a journal portion 6 to facilitate turning of the rotisserie when utilized indoors, for example, with conventional domestic and/or commercial ovens, or when utilized outdoors with conventional barbecue equipment.

A pair of oppositely disposed annular skewer supporting plates or disks 8 and 10 are slidably and detachably mounted on the shaft 2, and each disk has a hub portion 12 which is preferably integral therewith and is retained on the shaft by means of a set screw 13 for permitting axial adjustment of the respective disks relative to the shaft. The disks may be made of any metallic material, such as steel or aluminum, suitable for functioning as end walls and for directing heat to the food items during cooking.

In the form illustrated, the front or driving disk 8 may preferably have a plurality of equally spaced generally rectangular slots 14 opening onto the peripheral surface thereof each of which is adapted for slidably receiving one end of a skewer 18 therein. The rear or driven disk 10 may be provided with a corresponding number of equally spaced apertures 16 spaced adjacent the peripheral surface thereof, and disposed in axial alignment with the slots 14 in the front disk 8 for receiving the other ends of the respective skewers therein.

Each skewer 18 may be generally square or rectangular in cross-section to prevent rotation of the food items impaled thereon during the cooking process. Each skewer is preferably pointed at one end 19 to facilitate impaling food items and is provided at its other end with a generally circular return bend 20 which acts as a handle, and also as an abutment to limit axial movement of the skewer when in the assembled position. As shown, the skewers are slidably secured adjacent their handled ends within the circumferential slots 14 formed in the front disk 8, while the pointed ends of the skewers are slidably disposed through the spaced apertures 16 provided in the rear disk 10. In the form illustrated, six skewers are removably mounted between the opposed disks to extend in parallelism with each other and with the spit or shaft 2. By such an arrangement, any number of food items and of varying size may be cooked at a single time and in a manner so as not to interfere with one another during the cooking process. To accommodate exceptionally long food items, such as roasts, ribs and the like, the disks 8 and 10 may be axially adjusted by simple adjustment of the respective set screws 13.

To selectively retain the skewers in the assembled condition, one of the disks, preferably the front disk 8, may be provided with a pair of oppositely disposed generally arcuate slide plates 22 and 24 mounted for sliding engagement on the outer surface or face of the disk, as best shown in FIGS. 1 to 3. Each arcuate slide plate is preferably provided with a plurality of L-shaped retaining slots 25 defined by a generally arcuate cut-out seat portion 26 communicating with a second cut-out portion 28, which extends generally normally therefrom, and which opens onto the peripheral surface of the disk to define an arcuate retaining shoulder 30 therewith. In the form illustrated, each slide plate is preferably provided with three L-shaped retaining slots 25 and adapted when mounted on the disk 8 for sliding registration with the corresponding radially extending slots 14 provided therein. Each slide plate may further be provided with an upstanding projection 31, which serves as a handle-like means for manually registering the corresponding slots to effect the desired detachable interlocking of a predetermined number of skewers therein, as will hereinafter be more fully described.

To provide a precise interlocking movement of the slide plates 22 and 24 relative to the disk 8, a plurality of guide studs 32 may be affixed at one end to the disk 8 and project toward their other ends through corresponding elongate, arcuate guide slots 34 formed in the respective slide plates to allow rotation of the slide plates relative to the outer surface or face of the disk. The ends of the arcuate guide slots 34 act as stops for limiting rotational movement of the slide plates, and maintain an accurate interlocking of the skewers in the assembled position.

The front disk 8 is also preferably provided with a resilient spring arrangement which includes a pair of elongated threaded screws 35 affixed at one end to the disk and each of which project toward their other end through corresponding apertures 36 provided in the respective slide plates 22 and 24. A resilient means 37, such as coiled compression springs, are disposed around the respective screws 35 bearing at one end against the outer surface of the disk 8 and bearing at their other ends against a suitable fastener, such as a butterfly nut 38, threadably secured on the free end of the respective screws. By proper adjustment, the desired amount of compressive force may be applied to the springs for resiliently biasing the respective slide plates 22 and 24 against the outer surface of the disk 8 whereby the slide plates may be mounted in permanent interlocking relation relative to the disk during rotation of the rotisserie.

Referring to FIGS. 4 and 5, there is shown modified forms of the novel arrangement for detachably interlocking a plurality of skewers on the rotisserie. As shown in FIG. 4, three arcuate slide plates 40 may be slidably mounted on the front disk 42 for detachably interlocking three sets of skewers and wherein each set of skewers includes two individual skewers. In the form illustrated, each slide plate 40 may be provided with a pair of generally L-shaped retaining slots 44 which are adapted for registration with corresponding radially extending slots provided in the disk. In the form illustrated, each arcuate slide plate is preferably provided with a single guide stud 48 and arcuate guide slot 50 arrangement adjacent one end thereof for guiding and limiting sliding movement of the slide plates relative to the disk 42. Each arcuate slide plate 40 is provided adjacent its other end with the aforementioned type of slot 52 and coil compression spring arrangement 54 which acts to maintain a resilient sliding coaction of the respective arcuate slide plates 40 relative to the disk 42, and which also acts to guide and limit movement of the slide plates relative to the disk 42, as aforementioned.

As shown in FIG. 5, four arcuate slide plates 60 are mounted for sliding movement on a front disk 62 for detachably interconnecting four sets of skewers wherein each set includes two individual skewers. In the form illustrated, each slide plate is preferably provided with a pair of generally L-shaped retaining slots 64 which are adapted for registration with corresponding radially extending slots provided in the disk. Similarly, a guide stud 68 and guide slot 70 arrangement may be provided adjacent one end of each slide plate, whereas, a slot 72 and adjustable compression spring 74 arrangement are provided adjacent the other end thereof and for the purposes as hereinbefore set forth.

Accordingly, it can be seen that any number of slide plates can be symmetrically mounted on one of the disks to detachably interlock any number of skewers therein and in multiples of two, three, four and so forth, as desired. While for purposes of disclosure, the front and rear disks and respective slide plates have been illustrated as being generally circular or of an arcuate configuration, it will be understood that they could also be utilized with any other configuration, such as for example, polygonal, square or rectangular configurations in accord with the principles of the present invention.

In practicing the present invention, and with particular reference to FIGS. 1 to 3, the rotisserie of the present invention may be assembled in a conventional domestic oven for indoor cooking or may be mounted on a conventional barbecue grill and driven by hand or by suitable electric motor means for outdoor use. When thus assembled, the spit or shaft 2 may then be rotated until the slots 14 of the front disk 8 and the corresponding registered L-shaped retaining slots 25 in the slide plate 22 reach an uppermost position. The pointed end of the three skewers 18 may then be inserted in the companion apertures 16 in the rear disk 10 and the handled ends of the skewers dropped through the slots 14 and 25 into the seat portions 26 provided in the arcuate slide plate 22. The handle 31 may then be moved downwardly, as shown by the arrow in FIG. 2, to rotate the slide plate 22 in a clockwise direction relative to the disk 8. During such movement, the arcuate retaining shoulders 31 formed in the slide plate close over the underlying skewers 18 to thereby effect an automatic and simultaneously interlocking of all three skewers on the supporting disk. The split 2 may then be rotated to bring the slide plate 24 into an uppermost position and three additional skewers interlocked, in the manner prescribed, to completely load the rotisserie for cooking. When the food items are adequately cooked, the skewers may then be automatically and simultaneously released from locking engagement with the rotisserie.

Moreover, it can be seen that an important feature of the present invention resides in the use of an interlocking or retaining means whereby two, three, four or any number of skewers may be simultaneously and selectively attached or removed from the rotisserie by a simple and quick manual operation. Such an arrangement obviates the heretofore existent requirement of having to lock and unlock each skewer individually relative to the rotisserie, and provides a positive and dependable interlocking of the skewers during rotation thereof to prevent food items from falling wastefully into the heating media. In addition to providing an efficient and dependable interlocking arrangement, the present invention incorporates a construction which is economical and simple of operation, with a minimum of parts which may be quickly and easily cleaned. Such an arrangement is particularly adapted for construction in various sizes and is particularly susceptible to conversion for either indoor or outdoor cooking purposes.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention as set forth in the appended claim.

I claim:

A rotisserie comprising a rotatable shaft, a pair of oppositely disposed skewer support discs mounted for rotation with said shaft, a plurality of skewers detachably mounted on said support discs for moving food items impaled thereon about the horizontal axis of said shaft, one of said support discs having a plurality of symmetrically spaced, radially disposed apertures adjacent the periphery thereof for securing one end of said skewers, the other of said support discs having a plurality of radially extending slots opening onto the periphery thereof and in axial alignment with said apertures for receiving the other end of said skewers, said last mentioned support disc resiliently mounting a plurality of selectively operable generally arcuate slide plates, said slide plates being circumferentially mounted for friction sliding coaction on said support discs, each of said slide plates having a plurality of generally L-shaped retaining slots opening onto the periphery thereof for registration with the radially extending slots in said one of said support discs for simultaneously interlocking the ends of said skewers upon rotational movement of said slide plates relative to said support disc, and wherein the resilient mounting of each of said slide plates on said supporting disc includes a threaded member extending from said support disc and disposed through a generally arcuate slot in the respective of said slide plates, and a coiled compression spring disposed on said threaded member between said slide plate and an adjustable means threadably disposed on said threaded member, said resilient mounting being operable to maintain a predetermined resilient biased engagement of said slide plate on said supporting disc.

References Cited in the file of this patent

UNITED STATES PATENTS

| | | |
|---|---|---|
| 1,779,121 | Franz | Oct. 21, 1930 |
| 2,668,541 | Anglin | Feb. 9, 1954 |
| 2,811,915 | Sarkisian | Nov. 5, 1957 |

FOREIGN PATENTS

| | | |
|---|---|---|
| 244,495 | Germany | Mar. 11, 1912 |
| 280,893 | Italy | Dec. 23, 1930 |
| 1,093,890 | France | May 10, 1955 |